(No Model.) 2 Sheets—Sheet 1.
E. WELTY.
STOP MOTION FOR ROVING, DRAWING, AND CONCENTRATING MACHINES.
No. 563,343. Patented July 7, 1896.
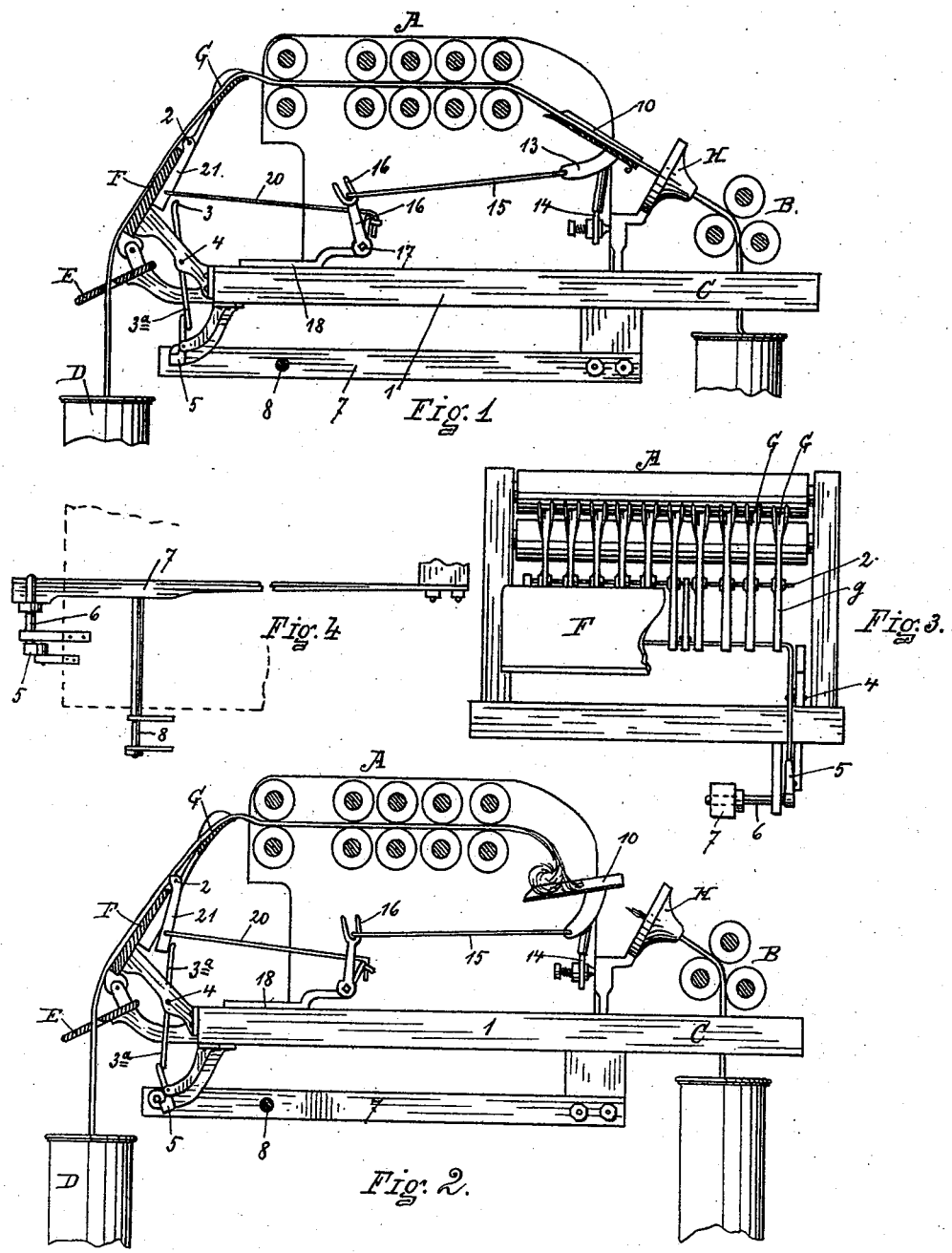
WITNESSES.
Rich. A. George
Dwight H. Colegrove
INVENTOR
EMILE WELTY
By Risley, Robinson & Love
ATTORNEYS (No Model.) 2 Sheets—Sheet 2.

E. WELTY.
STOP MOTION FOR ROVING, DRAWING AND CONCENTRATING MACHINES.

No. 563,343. Patented July 7, 1896.

WITNESSES
Rich. A. George
Dwight H. Colegrove

INVENTOR
EMILE WELTY.
By Risley, Robinson & Love
ATTORNEYS.

UNITED STATES PATENT OFFICE.

EMILE WELTY, OF UTICA, NEW YORK.

STOP-MOTION FOR ROVING DRAWING AND CONCENTRATING MACHINES.

SPECIFICATION forming part of Letters Patent No. 563,343, dated July 7, 1896.

Application filed December 11, 1895. Serial No. 571,750. (No model.)

*To all whom it may concern:*

Be it known that I, EMILE WELTY, of Utica, in the county of Oneida and State of New York, have invented certain new and useful Improvements in Automatic Stop-Motions for Roving-Drawing Machines; and I do hereby declare that the following is a full, clear, and exact description of the invention, which will enable others skilled in the art to which it appertains to make and use the same, reference being had to the accompanying drawings, and to the letters and numerals of reference marked thereon, which form part of this specification.

My invention relates to improvements in an automatic stop-motion for a drawing and concentrating machine for operating on roving.

Figure 5:
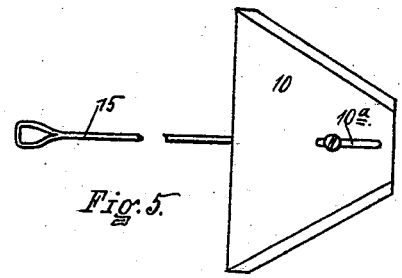
Figure 9:
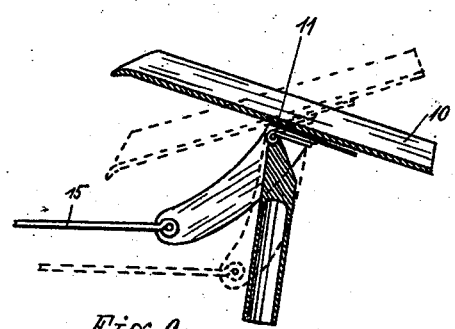
Figure 6:
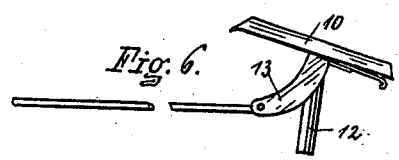
Figure 7:
Figure 10:
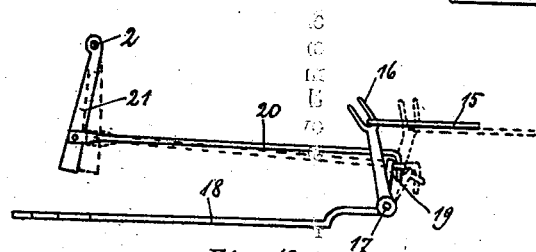
Figure 11:
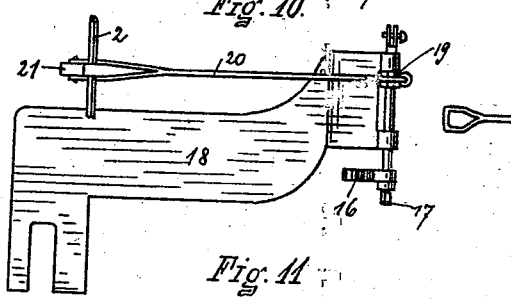
Figure 8:
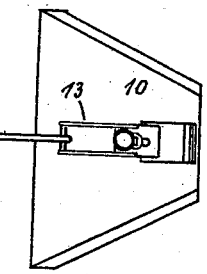

In the drawings which accompany and form a part of this specification, Figure 1 shows a portion of the drawing and coiling machine having my automatic stop-motion applied thereto. This figure shows the machine in operative position. Fig. 2 shows the same as Fig. 1 after the automatic stop-motion has operated. Fig. 3 shows details relating to the connection between the automatic stop-motion and the driving power of the machine. Fig. 4 shows in a plan view in part the same and in part other details relating to the same. Fig. 5 shows a plan view of the pan or chute over which the roving passes and constituting a portion of my automatic stop-motion. Fig. 6 shows in side elevation the same parts shown in Fig. 5. Fig. 7 shows details relating to the support for the same. Fig. 8 shows a bottom view of this pan or chute. Fig. 9 shows a vertical section of the construction as shown in Fig. 6. Fig. 10 shows a side elevation of lever-arms, connections, and base forming a part of the automatic stop-motion. Fig. 11 shows a plan view of the parts shown in Fig. 10.

Referring to the reference letters and numerals in a more particular description of the device, 1 indicates the table of the machine to which my automatic stop-motion is adapted to be applied. This machine is provided with a set of feeding and drawing rollers A, which draw and feed the roving into a set of concentrating-rollers B, which further draw and double the roving and deliver it to the coiling device, which is not shown, but which is located in the machine at about the position indicated by the letter C. The machine is constructed and arranged to draw and concentrate from five to ten strands or slivers of roving and deliver them in a single drawing. To this end the machine is provided at one nd with a series of cans D, each of which hold ne of the rovings to be operated upon by the achine. From the can the roving passes hrough an aperture in the plate E, thence ver an inclined guide-board F, and over the poon-like guides G into the rollers A. From the rollers A the rovings pass through the concentrating-funnel H to the concentrating-ollers B. It may be noted that the rollers B are much shorter in length than the rollers A, as all the strands of material which are fed etween the rollers A are concentrated by the funnel H before reaching the rollers B.

The spoon-like guides G, over which the rovings pass, constitute a part of an automatic stop-motion which operates to stop the machine if the roving breaks before it enters the rollers A, while my automatic stop-motion is intended to stop the machine when there is any break or trouble with the rovings after having passed through the rollers A. As these two devices operate by a common means to stop the machine, I will describe the operation of the one operating from the spoon-guides G first.

It will be noted that the several guides G are pivoted upon a common shaft 2, extending across the feeding side of the machine, ten of these being shown in Fig. 3 of the drawings. The lower end of these guides are provided with a counterweight *g*, which will tend to throw the guide into a vertical position from the position shown in Fig. 1 when not held in the position shown in Fig. 1 by the roving passing over the guide. When the roving breaks or becomes too slack, the guide G swings from the position shown in Fig. 1 to a vertical position, or substantially so, and in so doing strikes at its lower end against the horizontal bar 3 of the catch-operator 3ª, which is pivoted to the frame at 4 and is adapted to engage at its lower end the pivoted lock 5, pivoted on the machine. The lock 5 operates to hold in check, by means of a short-collared spindle 6, the spring-lever 7, which is connected with and adapted to operate the belt-shifter 8, so that when the guides G fall into a vertical position, by means of the catching-tripper 3ª, they trip the lock 5, releasing the short spindle 6 and the spring-lever or bar 7, which by reason of its tension immediately shifts the belt from a tight to a loose pulley, throwing the machine out of operation. When the attendant has rearranged the rovings, so as to feed properly into the machine, he resets the spring-lever 7 and the catch 5 and thereby puts the machine in motion again. Other attachments and contrivances may be provided for the same purpose and which can be operated with very little force.

Now to proceed to describe the special automatic stop-motion of my invention: I locate between the delivery side of the drawing-rollers A and the concentrating-funnel H, the tapering pan 10, which is pivoted at 11 upon a supporting-standard 12 and is provided with arms 13. The supporting-standard 12 has a tubular socket which receives a post 14, secured on the machine in suitable position to locate the guide-pan in the position shown and thus permit it to be readily removed. From the arms 13 there is extended a connection 15 to the upright forked arm 16, located on the rocking shaft 17. The rocking shaft 17 is carried in bearings in the base 18, secured on the table or frame of the machine. On the shaft 17 is also provided an upwardly-extending projection 19, provided with an eye in which the hooked end of the connection 20 is engaged. The connection 20 extends from the arm 19 to the swinging tripper 21, pivoted on the small shaft 2, on which the spoon-guides G are pivoted. This tripper 21 is adapted to strike against the tripping-bar 3, substantially in the same way as the lower ends of the spoon-guides G, as will be readily seen from Fig. 3. The pan-guide 10 is adjustably mounted on its pivot 11 by providing a slot and set-screw 10ª, but the major portion of the weight of the pan is always on the left-hand side of the pivot, as shown in Fig. 9, and the tendency of the pan when not otherwise held is to assume the position shown in dotted lines in Fig. 9. The adjustment just described enables the mechanism to be adjusted to the number of rovings which are being concentrated into one and the size and weight of the rovings operated on. The operation of this portion of the mechanism is as follows: If the rovings should break or become slack between the set of rollers A and set B or break and wad up on the pan, as shown in Fig. 2, the gravity of the pan 10 and the weight of the tripper 21 would move the mechanism from the position shown in Fig. 1 to that shown in Fig. 2 and operate by means of the arm 3 and the catch 5 to release the belt-shifter and shift the belt, as heretofore described. In getting the machine into running order again, it is necessary to bring the pan 10 into its normal position, which is inclined, as shown in Fig. 1, and get the rovings properly running through it, so as to hold it in this position and reset the belt shifting and securing devices.

It will be observed that the stop-motion mechanism is easily taken apart and removed, by lifting the pan with its socket-support 12 off from the supporting-post 14 and unhooking the connection 15 from the upper end of the forked arm 16, and the device may be further removed, although this will not often be found necessary.

What I claim as new, and desire to secure by Letters Patent, is—

1. The combination with the drawing-rolls and concentrating-rolls, of a tilting guide-pan the operating-face of which is located substantially in a line between the drawing and concentrating rolls, a stop-motion mechanism and a connection between the pan and stop-motion mechanism, substantially as set forth.

2. The combination with a drawing-frame of a tilting roving guide-pan over the surface of which the rovings pass and a stop-motion mechanism connected with the pan, substantially as set forth.

3. The combination with the drawing and concentrating rolls, of a tilting pan mounted directly over its pivot and substantially in a line between the drawing and concentrating rolls, a stop-motion mechanism and a connection between the tilting pan and stop-motion, substantially as set forth.

4. The combination in a drawing-machine of the drawing-rolls, the concentrating-rolls, the tilting, unevenly-balanced, guide-pan located directly over its pivot, with the surface substantially in line between the drawing-rolls and concentrating-rolls, a stop-motion mechanism and a connection between the stop-motion mechanism and the pan, substantially as set forth.

In witness whereof I have affixed my signature in presence of two witnesses.

EMILE WELTY.

Witnesses:
GEORGE C. CARTER,
DWIGHT H. COLEGROVE.